(12) United States Patent
Kadono et al.

(10) Patent No.: US 10,414,687 B2
(45) Date of Patent: Sep. 17, 2019

(54) INFRARED-TRANSMITTING GLASS SUITABLE FOR MOLD FORMING

(71) Applicant: NATIONAL UNIVERSITY CORPORATION KYOTO INSTITUTE OF TECHNOLOGY, Kyoto-shi, Kyoto (JP)

(72) Inventors: Kohei Kadono, Kyoto (JP); Arifumi Okada, Kyoto (JP); Takashi Wakasugi, Kyoto (JP); Tomoyo Ashida, Kyoto (JP)

(73) Assignee: NATIONAL UNIVERSITY CORPORATION KYOTO INSTITUTE OF TECHNOLOGY, Kyoto-shi (JP)

( * ) Notice: Subject to any disclaimer, the term of this patent is extended or adjusted under 35 U.S.C. 154(b) by 184 days.

(21) Appl. No.: 15/561,725

(22) PCT Filed: Mar. 31, 2016

(86) PCT No.: PCT/JP2016/060776
§ 371 (c)(1),
(2) Date: Sep. 26, 2017

(87) PCT Pub. No.: WO2016/159289
PCT Pub. Date: Oct. 6, 2016

(65) Prior Publication Data
US 2018/0099898 A1    Apr. 12, 2018

(30) Foreign Application Priority Data

Mar. 31, 2015 (JP) .................................. 2015-072911

(51) Int. Cl.
| | | |
|---|---|---|
| *C03C 3/32* | (2006.01) | |
| *C03C 4/10* | (2006.01) | |
| *C03B 11/08* | (2006.01) | |
| *C03B 11/12* | (2006.01) | |

(52) U.S. Cl.
CPC ............ *C03C 3/321* (2013.01); *C03B 11/084* (2013.01); *C03B 11/122* (2013.01); *C03C 3/323* (2013.01); *C03C 4/10* (2013.01); *C03B 2215/414* (2013.01)

(58) Field of Classification Search
CPC ........... C03C 3/32; C03C 3/321; C03C 3/323; C03C 4/10
See application file for complete search history.

(56) References Cited

U.S. PATENT DOCUMENTS

| 4,492,763 A | 1/1985 | Trotta et al. | |
|---|---|---|---|
| 2009/0270241 A1* | 10/2009 | Aitken | C03C 3/321 501/40 |
| 2010/0285946 A1 | 11/2010 | Tani et al. | |
| 2015/0038314 A1* | 2/2015 | Aitken | C03C 3/321 501/40 |

FOREIGN PATENT DOCUMENTS

| JP | 59-69444 A | 4/1984 | |
|---|---|---|---|
| JP | 2002-274882 A | 9/2002 | |
| JP | 2009-161374 A | 7/2009 | |
| JP | 5339720 B2 | 11/2013 | |
| WO | 1999/028256 A1 | 6/1999 | |
| WO | WO-2013006392 A1 * | 1/2013 | ............ C03C 3/321 |

OTHER PUBLICATIONS

Bo, F. et al., "Near-infrared down-conversion in rare-earth-doped chloro-sulfide glass GeS2—Ga2S3—CsCl: Er, Yb", Journal of Applied Physics, American Institute of Physics, Dec. 1, 2011, vol. 110, No. 11, pp. 1131071-1 to 113107-8; cited in Extended (supplementary) European Search Report dated Oct. 2, 2018.

Zhang, X. et al, "A new class of infrared transmitting glass-ceramics based on controlled nucleation and growth of alkali halide in a sulphide based glass matrix", Journal of Non-Crystalline Solids, North-Holland Physics Publishing, Jul. 1, 2004, vol. 337, No. 2, pp. 130-135; cited in Extended (supplementary) European Search Report dated Oct. 2, 2018.

Extended (supplementary) European Search Report dated Oct. 2, 2018, issued in counterpart European Application No. 16773169.4. (5 pages).

International Search Report dated Jun. 7, 2016, issued in counterpart application No. PCT/JP2016/060776. (2 pages).

Popescu, "Non-Crystalline Chalcogenides", Kluwer Academic Publishers (Dordrecht), 2000, pp. 4-102 (Chapter I), (54 pages).

Barnier et al., "Etude de L'environnement de L'antimoine Dans les Verres Gallium-Antimoine-Soufre en Liaison Avec le Diagramme de Phase Et les Spectres D'absorption Infrarouge", Materials Research Bulletin, 1993, vol. 28, pp. 399-405, (7 pages).

Othman et al., "Non-isothermal crystallization kinetics study on new amorphous $Ga_{20}Sb_5S_{75}$ and $Ga_{20}Sb_{40}S_{40}$ chalcogenide glasses", Journal of Non-Crystalline Solids, 2005, vol. 351, pp. 130-135, (6 pages).

(Continued)

*Primary Examiner* — Elizabeth A. Bolden
(74) *Attorney, Agent, or Firm* — Westerman, Hattori, Daniels & Adrian, LLP

(57) ABSTRACT

The present invention provides an infrared-transmitting glass that is a chalcogenide glass, has a reduced Ge content, can sufficiently cover atmospheric windows, is free from highly toxic elements, such as Se and As, and is suitable for mold forming. Specifically, the present invention provides an infrared-transmitting glass suitable for mold forming, comprising, in terms of molar concentration:

0 to 2% of Ge, 3 to 30% of Ga, 10 to 40% of Sb, 45 to 70% of S, 3 to 30% of at least one member selected from the group consisting of Sn, Ag, Cu, Te, and Cs, and 0 to 30% of at least one member selected from the group consisting of Cl, Br, and I.

9 Claims, 3 Drawing Sheets

(56) References Cited

OTHER PUBLICATIONS

Othman et al., "Annealing dependence of optical properties of $Ga_{20}S_{75}Sb_5$ and $Ga_{20}S_{40}Sb_{40}$ thin films", Thin Solid Films, 2004, vol. 457, pp. 253-257, (5 pages).

* cited by examiner

1. △
2. ▲
3. □
4. ○
5. ■
6. ●

INFRARED-TRANSMITTING GLASS SUITABLE FOR MOLD FORMING

TECHNICAL FIELD

The present invention relates to an infrared-transmitting glass suitable for mold forcing.

BACKGROUND ART

In the fields of security, safety, etc., infrared cameras, infrared sensors, and the like are used as, for example, crime prevention devices and authorization devices. These sensors use infrared rays, and optical elements used in the sensors comprise infrared-transmitting materials that allow infrared rays to pass through. More specifically, infrared-transmitting materials that allow infrared rays having a wavelength of 3 to 5 μm and 8 to 12 μm, which are called "atmospheric windows," to pass through are required.

These devices have recently been increasingly required to have high performance, a small size, and high versatility, due to, for example, the heightened awareness of security, safety, etc., and social needs. Therefore, it is also necessary to reduce the size of sensors used in these devices. Optical elements are required to have high performance and a small size, and high productivity is required for the production process of optical elements.

Examples of infrared-transmitting materials include germanium (Ge) and zinc selenide (ZnSe). However, because they are crystals, the processing means of these infrared-transmitting materials is limited to polish forming. Therefore, it is difficult, in terms of process and cost, to mass-produce optical elements having a complicated shape, such as aspheric lenses and lens arrays, using these materials. In particular, it is not easy to use germanium, which is an expensive material, in versatile sensors and the like.

In contrast, examples of infrared-transmitting materials that are not crystals include chalcogenide glasses comprising S, Se, Te, As, etc., as main components. Various proposals have been made on glasses suitable for mold forming and glasses having high glass-forming ability, which are advantageous for the mass production of optical elements (NPL 1, etc.). However, the chalcogenide glasses disclosed in NPL 1, etc., contain many highly toxic elements, such as Se and As. Thus, these glasses have safety concerns.

Moreover, PTL 1 discloses an infrared-transmitting glass comprising two or more materials selected from Groups III, V, VI, and VII of the periodic table in preselected amounts for forming a low-dispersion glass at wavelengths of infrared energy. However, the Examples of PTL 1 specifically disclose only a glass containing Se, which has safety concerns. The specific composition of a glass further containing S of Group VI is nowhere described in PTL 1.

In order to solve the above concerns, PTL 2 discloses an "infrared-transmitting glass for mold forming, the glass comprising, in terms of molar concentration, 2 to 22% of Ge, 6 to 34% of at least one element selected from the group consisting of Sb and Bi, 1 to 20% of Sn, and 58 to 70% of at least one element selected from the group consisting of S, Se and Te." According to the Ge—Sb—Sn—S glass of PTL 2, an infrared-transmitting glass that is suitable for mold forming without containing highly toxic elements, such as Se and As, can be obtained (claim 1, Advantageous Effects of Invention, etc.).

However, the infrared transmission limit wavelength of the infrared-transmitting glass of PTL 2 on the long wavelength side is about 11 μm, and this glass cannot sufficiently cover atmospheric windows. There is room for improvement in this respect.

Furthermore, prior-art documents relating to the present application include NPL 2 to NPL 4; however, these documents only disclose Ga—Sb—S three-component glasses, but do not disclose the production of glasses comprising four or more components by adding other components, and the effects of such glasses.

CITATION LIST

Patent Literature

PTL 1: JPS59-69444A
PTL 2: JP5339720B

Non-patent Literature

NPL 1: "Non-Crystalline Chalcogenides," Kluwer Academic Publishers (Dordrecht) (2000)
NPL 2: Mat. Res. Bull., 28 (1993) pp. 399-405
NPL 3: J. Non-Cryst. Solids, 351 (2005) pp. 130-135
NPL 4: Thin Solid Films, 457 (2004) pp. 253-257

SUMMARY OF INVENTION

Technical Problem

A primary object of the present invention is to provide an infrared-transmitting glass that is a chalcogenide glass, has a reduced Ge content, can sufficiently cover atmospheric windows, is free from highly toxic elements, such as Se and As, and is suitable for mold forming.

Solution to Problem

The present inventors conducted extensive research to achieve the above object, and consequently found that the above object can be achieved by a chalcogenide glass of a specific composition. Thus, the present invention has been completed.

Specifically, the present invention relates to the following infrared-transmitting glasses suitable for mold forming.

1. An infrared-transmitting glass suitable for mold forming, comprising, in terms of molar concentration:
   0 to 2% of Ge,
   3 to 30% of Ga,
   10 to 40% of Sb,
   45 to 70% of S,
   3 to 30% of at least one member selected from the group consisting of Sn, Ag, Cu, Te, and Cs, and
   0 to 30% of at least one member selected from the group consisting of Cl, Br, and I.

2. The infrared-transmitting glass according to item 1, wherein the glass comprises Cs and at least one halogen element selected from the group consisting of Cl, Br, and I, and the molar concentration of the halogen element is 3 to 20%.

3. The infrared-transmitting glass according to item 1 or 2, wherein the total molar concentration of Cl and Br is equal to or less than the total molar concentration of Ag, Cu, and Cs.

4. The infrared-transmitting glass according to any one of items 1 to 3, wherein the glass is free from Se and Cs.

5. The infrared-transmitting glass according to any one of items 1 to 4, wherein the glass allows infrared rays having a wavelength of 3 to 13 μm to pass through.

6. The infrared-transmitting glass according to any one of items 2 to 5, wherein the glass further allows light in part of the visible region to pass through.

7. The infrared-transmitting glass according to any one of items 1 to 6, wherein the difference (ΔT) between the crystallization temperature (Tc) and the glass transition temperature (Tg) is 230 K or more.

8. The infrared-transmitting glass according to any one of items 1 to 6, wherein no crystallization is observed when the glass is heated to 600° C.

9. The infrared-transmitting glass according to any one of items 1 to 8 for producing a spherical lens, an aspheric lens, a lens array, a microlens array, or a diffraction grating by mold forming.

Advantageous Effects of Invention

The infrared-transmitting glass of the present invention can sufficiently cover atmospheric windows, because the glass allows infrared rays having a wavelength of 3 to 13 μm to pass through. In addition, the infrared-transmitting glass of the present invention is advantageous in terms of cost, because the Ge content is reduced. Moreover, the infrared-transmitting glass of the present invention has increased safety, because it does not need to contain highly toxic elements, such as Se and As. Furthermore, the infrared-transmitting glass of the present invention is suitable for mold forming, because it is a chalcogenide glass, which is not a crystal. Optical elements having infrared transmission properties can be easily produced by mold forming, even though the optical elements have a complicated shape, such as aspheric lenses and lens arrays.

DESCRIPTION OF EMBODIMENTS

Figure 1:
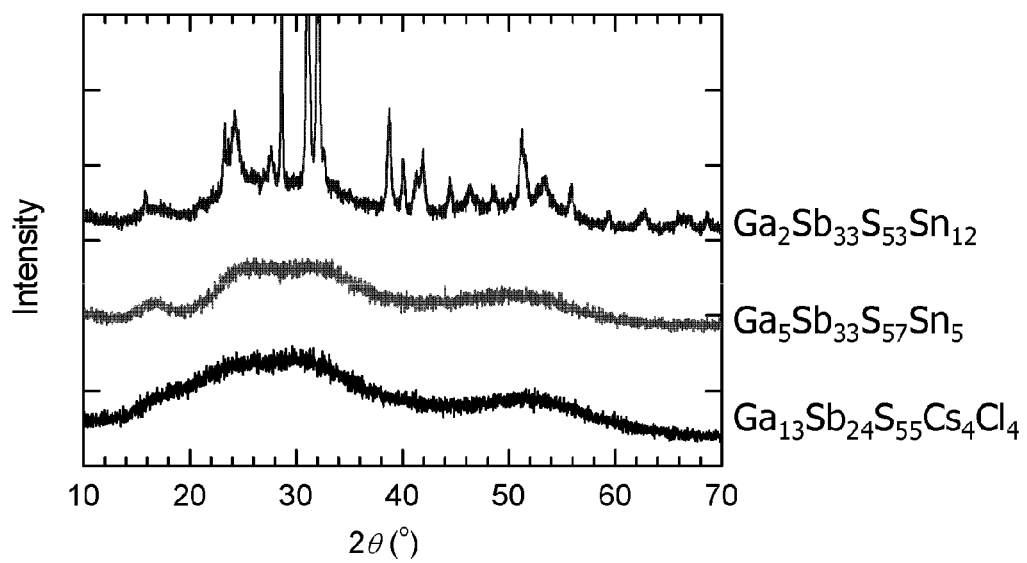
FIG. 1 shows the X-ray diffraction patterns of contents obtained in Example 3, Example 5, and Comparative Example 7.

The infrared-transmitting glass of the present invention is described below.

The infrared-transmitting glass of the present invention is a chalcogenide glass, and comprises, in terms of molar concentration:

0 to 2% of Ge,
3 to 30% of Ga,
10 to 40% of Sb,
45 to 70% of S,
3 to 30% of at least one member selected from the group consisting of Sn, Ag, Cu, Te, and Cs, and
0 to 30% of at least one member selected from the group consisting of Cl, Br, and I.

The infrared-transmitting glass of the present invention having the above composition can sufficiently cover atmospheric windows, because the glass allows infrared rays having a wavelength of 3 to 13 μm to pass through. In addition, the infrared-transmitting glass of the present invention is advantageous in terms of cost, because the Ge content is reduced. Moreover, the infrared-transmitting glass of the present invention has increased safety, because it does not need to contain highly toxic elements, such as Se and As. Furthermore, the infrared-transmitting glass of the present invention is suitable for mold forming, because it is a chalcogenide glass, which is not a crystal. Optical elements having infrared transmission properties can be easily produced by mold forming, even though the optical elements have a complicated shape, such as aspheric lenses and lens arrays.

Each component of the infrared-transmitting glass of the present invention is described below. In a multicomponent glass material, the components affect each other to determine the peculiar characteristics of the glass material. It is thus not necessarily appropriate to discuss the quantitative range of each component depending on the characteristics of each component; however, the base of specifying the quantitative range of each component of the infrared-transmitting glass of the present invention is described below.

The infrared-transmitting glass for mold forming of the present invention comprises, in terms of molar concentration (=content):

0 to 2% of Ge,
3 to 30% of Ga,
10 to 40% of Sb,
45 to 70% of S,
3 to 30% of at least one member selected from the group consisting of Sn, Ag, Cu, Te, and Cs, and
0 to 30% of at least one member selected from the group consisting of Cl, Br, and I.

Ge is generally known as an element that forms the network structure of glass. Ge is not an essential component in the present invention. When Ge is contained, the Ge content is preferably 2% or less, more preferably less than 2%, and most preferably 0% (not contained). Due to the Ge content adjusted to 2% or less, the infrared transmission limit wavelength can be shifted to the long wavelength side, and an infrared-transmitting glass that sufficiently covers atmospheric windows can be ensured. If the Ge content exceeds 2%, an infrared-transmitting glass that sufficiently covers atmospheric windows cannot be ensured, and it is disadvantageous in terms of cost. Thus, the upper limit of the Ga content is specified to 2% in the present invention.

Ga has the role of forming the network structure of glass. The Ga content may be 3 to 30%, but is preferably 4 to 20%. If the Ga content is less than 3% or greater than 30%, crystallization may occur.

Sb has the role of forming the network structure of glass, and stabilizing the network structure formed by Ga. The Sb content may be 10 to 40%, but is preferably 20 to 40%. If the Sb content is less than 10% or greater than 40%, crystallization may occur.

S has the element role of forming the skeletal structure of glass. The S content may be 45 to 70%, but is preferably 50 to 70%. If the S content is less than 40% or greater than 70%, mold formability may be reduced.

At least one member selected from the group consisting of Sn, Ag, Cu, Te, and Cs has the role of improving the thermal stability of glass. The content (total amount) thereof may be 3 to 30%, but is preferably 4 to 20%. If the content (total amount) thereof is less than 3% or greater than 30%, mold formability may be reduced.

At least one member selected from the group consisting of Cl, Br, and I is generally known to have the role of improving the thermal stability of glass, but is not an essential component in the present invention. When at least one member selected from the above group is contained, the total amount of the three components is 30% or less, and preferably 10% or less. This is because if the content (total amount) of these components increases, the water resistance of glass may be reduced. The lower limit of the total amount of the three components, when contained, is about 2%.

In a preferable embodiment, it is preferable that the infrared-transmitting glass of the present invention comprise Cs and at least one halogen element selected from the group consisting of Cl, Br, and I, and that the content of the halogen element be 3 to 20%. In this range, the content of the halogen element is more preferably 4 to 8%.

Because Cs and at least one halogen element selected from the group consisting of Cl, Br, and I are contained as essential components, and the content of the halogen element is 3 to 20%, the infrared-transmitting glass can ensure a transmission area for light in part of the visible region (about 0.5 to 0.75 μm) on the short wavelength side. Because light in part of the visible region is allowed to pass through, the alignment of an optical element using the infrared-transmitting glass of the present invention can be more easily controlled.

In a preferable embodiment of the infrared-transmitting glass of the present invention, the content (total amount) of Cl and Br is preferably equal to or less than the content (total amount) of Ag, Cu, and Cs. A reduction in water resistance can be prevented by adjusting the content in this manner.

The infrared-transmitting glass of the present invention may contain Ba, Ta, W, In, Bi, etc., as required, in addition to the above components. The content (total amount) of these components is preferably 0 to 10%, and more preferably 1 to 5%, although it is not limited thereto. Although the reason for the addition of these elements is not limited, these elements are added, for example, for the purpose of facilitating the formation of glass.

The infrared-transmitting glass of the present invention does not need to contain highly toxic elements, such as Se and As, and has higher safety than conventional infrared-transmitting glasses containing these elements.

The infrared transmission performance of the infrared-transmitting glass of the present invention can sufficiently cover atmospheric windows, because the infrared-transmitting glass allows infrared rays having a wavelength of 3 to 13 μm to pass through. More specifically, the infrared transmission limit wavelength on the long wavelength side is in the range of 12.9 to 13.5. The infrared transmission limit wavelength in the present specification refers to, among transmission spectra measured using a 1-mm-thick glass sample, an infrared transmission limit wavelength on the long wavelength side determined at a wavelength in which transmittance is half of the maximum transmittance.

In the infrared-transmitting glass of the present invention, the average transmittance of infrared rays having a wavelength of 3 to 13 μm is about 40 to 60%. Therefore, optical elements using the infrared-transmitting glass of the present invention can have a smaller size, compared with conventional infrared-transmitting glasses in which the infrared transmission limit wavelength on the long wavelength side is about 11 μm. Moreover, as stated above, when Cs and at least one halogen element selected from the group consisting of Cl, Br, and I are contained, and the content of the halogen element is 3 to 20%, the property of allowing light in part of the visible region to pass through can be imparted.

The glass transition temperature Tg of the infrared-transmitting glass of the present invention is preferably about 220 to 260° C. When crystallization occurs, the crystallization temperature Tc is preferably 300° C. or more, and more preferably 380° C./or more. The upper limit of the crystallization temperature Tc is about 600° C., but is not limited thereto.

Moreover, the thermal stability $\Delta T$, which is represented by $\Delta T$ (K)=Tc−Tg, is 50 K or more. A larger value of $\Delta T$ indicates that the glass has higher thermal stability and superior mold formability. When $\Delta T$ is 200 K or more, it can be said that mold formability is very high. In a preferred embodiment of the glass of the present invention, $\Delta T$ is 230 K or more, and mold formability is more improved than a typical Ge—Sb—S glass (Comparative Example 8, provided later). The upper limit of $\Delta T$ when crystallization occurs is about 500 K; however, in consideration of the results of the Examples, provided later, a preferred range of $\Delta T$ is 240 to 350 K, or 246 to 350 K.

Preferable embodiments of the infrared-transmitting glass of the present invention include an embodiment in which crystallization does not occur when the glass is heated to 600° C. Since glass itself may be molten when heated to 600° C., glass in which crystallization does not occur when heated to 600° C. has very high mold formability and superiority, compared with conventional products.

The method for producing the infrared-transmitting glass of the present invention is not limited. For example, the infrared-transmitting glass of the present invention can be produced by sealing predetermined amounts of raw materials of components in a silica glass ampoule, and vitrifying the content by heat treatment.

Examples of raw materials include simple substances, such as Ge, Ga, Sb, S, Sn, Ag, Cu, Te, $Br_2$, and $I_2$; chalcogenides, such as $Ga_2S_3$, $Ga_2Te_3$, $Sb_2S_3$, $Sb_2Te_3$, SnS, SnTe, $Ag_2S$, $Ag_2Te$, $Cu_2S$, and $Cu_2Te$; and halides, such as AgCl, AgBr, AgI, CuCl, CuBr, CuI, CsCl, CsBr, and CsI. These raw materials can foe used in any combination of two or more.

When the above production method is used, it is preferable that the inside of the silica glass ampoule used be sufficiently dried by a vacuum dryer. Moreover, during vitrification, it is preferable to perform heating at 500 to 1000° C., and more preferably 700 to 950° C. The heat treatment time may be a time in which the content is sufficiently vitrified. The heat treatment time is generally preferably 3 to 48 hours, and more preferably 6 to 24 hours.

The infrared-transmitting glass for mold forming of the present invention has high mold formability. In mold forming, the glass is heated to a temperature around the softening point, and, for example, the glass is heat-pressed between an upper die and a lower die to thereby form the glass into a desired shape. The heating temperature necessary for forming is not limited, but is preferably a temperature about 10 to 70° C. higher than the yield point, and more preferably a temperature about 20 to 50° C. higher than the yield point.

Optical elements to be produced by mold forming are not limited. Examples include aspheric lenses, lens arrays, microlens arrays, diffraction gratings, and the like for which infrared transmission properties are required. These are useful as optical elements used for various sensors using infrared rays. In a preferable embodiment of the infrared-transmitting glass of the present invention, it was confirmed that the sensitivity of the glass as an infrared sensor lens was increased by 30% or more, compared with a conventional typical example of Ge—Sb—S glass (glass of Comparative Example 8, described later).

EXAMPLE

The present invention is described in detail below with reference to Examples and Comparative Examples. However, the present invention is not limited to the Examples.

Examples 1 to 10 and Comparative Examples 1 to 8

Production of Infrared-Transmitting Glass, and Evaluation of the Obtained Glass

A silica glass ampoule was prepared, and the inside of the ampoule was washed with purified water. Then, using a rotary vacuum pump, the silica glass ampoule was heated by a burner under vacuum to evaporate moisture. Next, raw materials of components were mixed according to each composition shown in Table 1 below, and the mixture was put in the silica glass ampoule. After the inside of the ampoule was sufficiently vacuumized using a rotary vacuum pump, the ampoule was sealed using an $H_2$—$O_2$ burner.

The sealed silica glass ampoule was heated to 950° C. at a heating rate of 20° C./hour, and maintained at the same temperature for 8 hours. Then, the silica glass ampoule was naturally cooled to room temperature so that the content was vitrified.

In order to confirm that the content was vitrified, the content was measured by XRD using an X-ray diffractometer. The results showed that the contents of Examples 1 to 10 and Comparative Examples 1 to 3 and 8 were vitrified. In contrast, the contents of Comparative Examples 4 to 7 were not vitrified, and crystals were formed. Table 1 shows vitrified contents as ○, and devitrified contents as x.

FIG. 1 shows the X-ray diffraction patterns of the contents obtained in Example 3 ($Ga_{13}Sb_{24}S_{55}Cs_4C_{14}$), Example 5 ($Ga_5Sb_{33}S_{57}Sn_5$), and Comparative Example 7 ($Ga_2Sb_{33}S_{53}Sn_{12}$).

Next, the vitrified contents (hereinafter referred to as "glass samples") were measured for the glass transition temperature, crystallization temperature, and transmission limit wavelength. Table 1 shows the results.

Figure 2:
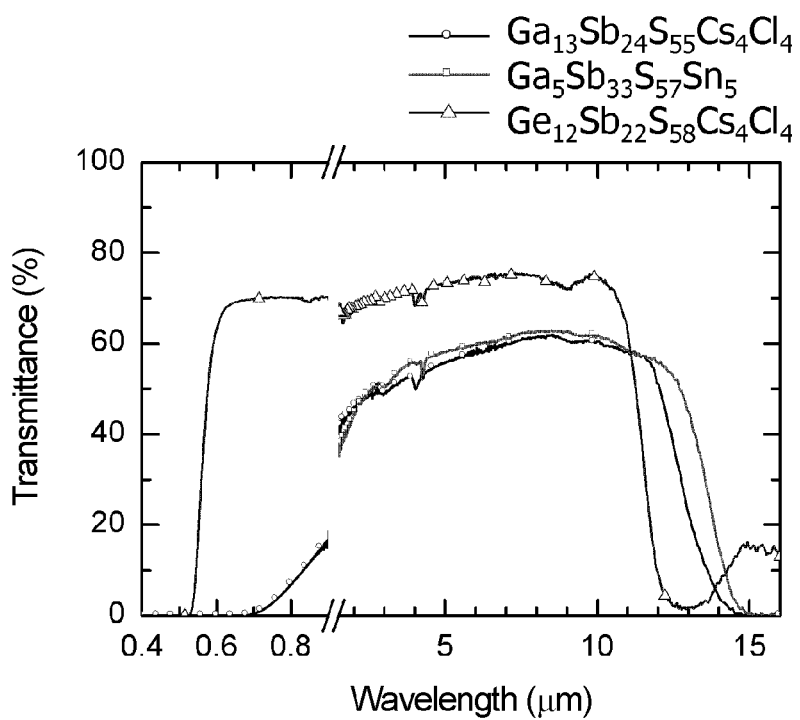
FIG. 2 shows the transmission spectra of glass samples obtained in Example 3, Example 5, and Comparative Example 8 in the visible region and the infrared region.

FIG. 2 shows the transmission spectra of the glass samples obtained in Example 3 ($Ga_{13}Sb_{24}S_{55}Cs_4C_{14}$), Example 5 ($Ga_5Sb_{33}S_{57}Sn_5$), and Comparative Example 8 ($Ge_{12}Sb_{23}S_{58}Cs_4Cl_4$) in the visible region and the infrared region. As is clear from the results of FIG. 2, the transmission limit wavelength on the long wavelength side of the glass samples of Examples 3 and 5 was shifted to the longer wavelength side, as compared with the glass sample of Comparative Example 8. This indicates that the atmospheric windows were sufficiently covered. It is also revealed that because the glass sample of Example 3 contained halogen and Cs, a transmission area was ensured for light in part of the visible region.

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Composition (mol %) | Ga | 4 | 9 | 13 | 8 | 5 | 8 | 13 | 8 | 8 | 9 |
|  | Sb | 33 | 28 | 24 | 25 | 33 | 29 | 26 | 29 | 25 | 21 |
|  | Ge |  |  |  |  |  |  |  |  |  |  |
|  | S | 55 | 55 | 55 | 51 | 57 | 58 | 56 | 59 | 59 | 57 |
|  | Sn |  |  |  |  | 5 | 5 | 5 | 4 | 8 | 13 |
|  | Cs | 4 | 4 | 4 | 8 |  |  |  |  |  |  |
|  | Cl | 4 | 4 | 4 | 8 |  |  |  |  |  |  |
| Vitrification [1] |  | ○ | ○ | ○ | ○ | ○ | ○ | ○ | ○ | ○ | ○ |
| Glass transition temperature Tg (° C.) |  | 235 | 240 | 251 | 243 | 228 | 243 | 258 | 247 | 245 | 242 |
| Crystallization temperature Tc (° C.) |  | 349 | 392 | 375 | 404 | 329 | 310 | 315 | 401 | 375 | 300 |
| ΔT (K) [2] |  | 114 | 152 | 124 | 160 | 101 | 67 | 57 | 154 | 130 | 58 |
| Transmission limit wavelength (μm) [3] |  | 13.0 | 12.9 | 13.0 | 13.1 | 13.5 | 13.3 | 13.0 | 13.3 | 13.5 | 13.4 |

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Composition (mol %) | Ga | 4 | 8 | 12 | 2 | 31 |  | 2 |  |
|  | Sb | 36 | 32 | 28 | 32 | 7 | 33 | 33 | 22 |
|  | Ge |  |  |  |  |  |  |  | 12 |
|  | S | 60 | 60 | 60 | 50 | 54 | 50 | 53 | 58 |
|  | Sn |  |  |  |  |  |  | 12 |  |
|  | Cs |  |  |  | 8 | 4 | 8 |  | 4 |
|  | Cl |  |  |  | 8 | 4 | 8 |  | 4 |
| Vitrification [1] |  | ○ | ○ | ○ | X | X | X | X | ○ |
| Glass transition temperature Tg (° C.) |  | 229 | 247 | 259 |  |  |  |  | 272 |

TABLE 1-continued

| Crystallization temperature Tc (° C.) | 343 | 381 | 358 | | | | | 496 |
|---|---|---|---|---|---|---|---|---|
| ΔT (K) [2] | 114 | 133 | 99 | | | | | 224 |
| Transmission limit wavelength (μm) [3] | 13.4 | 13.1 | 12.8 | | | | | 11.0 |

In Table 1, 1) to 3) are defined as follows.
1) ◯: Vitrified, x: Not vitrified
2) ΔT=crystallization temperature (Tc)–glass transition temperature (Tg)
3) Among transmission spectra measured using a 1-mm-thick glass sample, an infrared transmission limit wavelength on the long wavelength side determined at a wavelength in which transmittance is half of the maximum transmittance.

Production of Infrared-Transmitting Lens

The glass sample of Example 4 was subjected to mold forming in a nitrogen atmosphere at 270° C., thereby producing an aspheric lens. Consequently, an excellent aspheric lens was produced. When the glass samples obtained in the other Examples are used, excellent aspheric lenses can be similarly produced.

Examples 11 to 18

Production of Infrared-Transmitting Glass, and Evaluation of the Obtained Glass

A silica glass ampoule was prepared, and the inside of the ampoule was washed with purified water. Then, using a rotary vacuum pump, the silica glass ampoule was heated by a burner under vacuum to evaporate moisture. Next, raw materials of components were mixed according to each composition shown in Table 2 below, and the mixture was put in the silica glass ampoule. After the inside of the ampoule was sufficiently vacuumized using a rotary vacuum pump, the ampoule was sealed using an $H_2$—$O_2$ burner.

The sealed silica glass ampoule was heated to 350° C. at a heating rate of 20° C./hour, and maintained at the same temperature for 8 hours. Then, the silica glass ampoule was naturally cooled to room temperature so that the content was vitrified.

In order to confirm that the content was vitrified, the content was measured by XRD using an X-ray diffractometer. The results showed that all of the contents of Examples 11 to 18 were vitrified.

Next, the vitrified contents (glass samples) were measured for the glass transition temperature, crystallization temperature (including determination of the occurrence of crystallization), and transmission limit wavelength. Table 2 shows the results.

A larger difference ΔT between the crystallization temperature Tc and the glass transition temperature Tg indicates that the glass has higher thermal stability and superior mold formability. When ΔT exceeds 200 K, it can be said that mold formability is very high. For example, non-patent literature (Adv. Mater. 19, pp. 3796-3800 (2007)) reported that the optical characteristics (transmittance) of glass in which ΔT=124 K were not changed at all when the glass was subjected to pressure forming (mold forming) at a temperature equal to or higher than the glass transition temperature. Accordingly, it can be said that mold formability is very high when ΔT is 200 K or more.

The glasses obtained in Examples 11 to 18, in which ΔT was more than 200 K when the crystallization temperature was measured, includes glasses in which the crystallization temperature was not measured (Examples 13, 16, and 17). That the crystallization temperature was not measured indicates that crystallisation was not observed under experimental conditions of heating to 600° C. The results demonstrate that all of the glasses obtained in Examples 11 to 18 have very high mold formability.

The results reveal that all of the glasses of the present invention obtained in Examples 11 to 18 have excellent mold formability that is equal or superior to that of the typical example of conventional Ge—Sb—S glass (ΔT=224 K) shown in Comparative Example 8 of Table 1.

In Examples 17 and 18, part of Ga in Example 16 was replaced by Ge.

Figure 3:
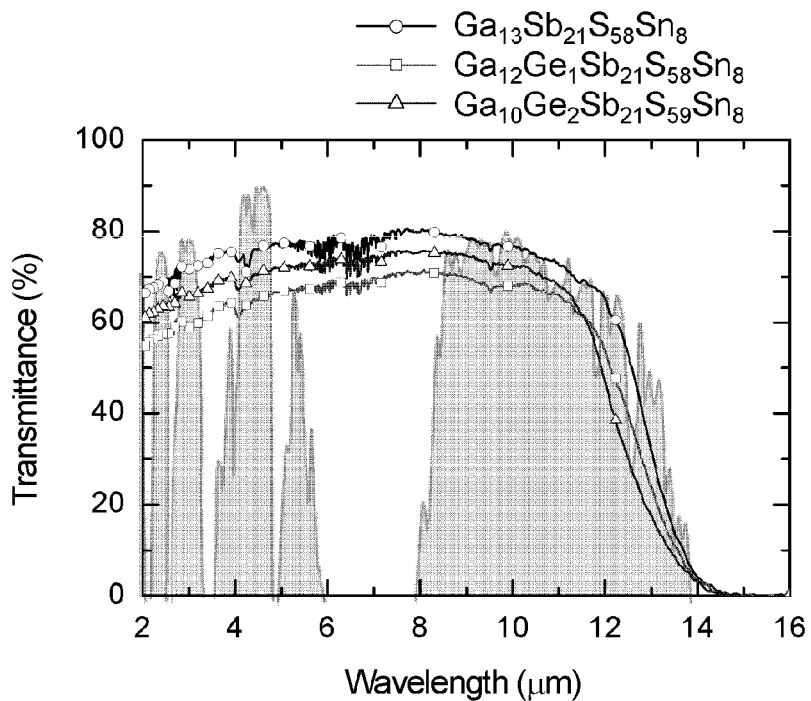
FIG. 3 shows the transmission spectra of glass samples obtained in Example 16, Example 17, and Example 18 in the infrared region. In the figure, shaded portions indicate the transmittance of air (atmospheric windows).

FIG. 3 shows the transmission spectra of the glass samples obtained in Example 16 ($Ga_{13}Sb_{21}S_{58}Sn_8$), Example 17 ($Ga_{12}Ge_1Sb_{21}S_{58}Sn_8$), and Example 18 ($Ga_{10}Ge_2Sb_{21}S_{59}Sn_8$) in the infrared region. In FIG. 3, shaded portions indicate the transmittance of air (atmospheric windows). Example 16 almost covered the atmospheric window on the long wavelength side; however, it is recognized that the transmission limit wavelength was gradually shifted to the short wavelength when Ga was replaced by Ge.

As is clear from Table 2, the crystallization temperature of the glass obtained in Example 17 was not measured, whereas the crystallization temperature of the glass obtained in Example 18 was measured, and ΔT was 253 K. The glass obtained in Example 18 still shows excellent mold formability; however, in consideration of the ability to cover atmospheric windows, when Ga is replaced by Ge, the Ge content is preferably 2% or less.

TABLE 2

| | | Example 11 | Example 12 | Example 13 | Example 14 | Example 15 | Example 16 | Example 17 | Example 18 |
|---|---|---|---|---|---|---|---|---|---|
| Composition (mol %) | Ga | 13 | 12 | 17 | 13 | 12 | 13 | 12 | 10 |
| | Sb | 21 | 17 | 12 | 21 | 17 | 21 | 21 | 21 |
| | Ge | | | | | | | 1 | 2 |
| | S | 50 | 45 | 45 | 50 | 45 | 58 | 58 | 59 |
| | Sn | | | | | | 8 | 8 | 8 |
| | Cs | 8 | 13 | 13 | 8 | 13 | | | |
| | Cl | 8 | 13 | 13 | | | | | |
| | Br | | | | 8 | 13 | | | |

TABLE 2-continued

|  | Example 11 | Example 12 | Example 13 | Example 14 | Example 15 | Example 16 | Example 17 | Example 18 |
|---|---|---|---|---|---|---|---|---|
| Vitrification [1] | ○ | ○ | ○ | ○ | ○ | ○ | ○ | ○ |
| Glass transition temperature Tg (° C.) | 248 | 233 | 246 | 239 | 229 | 260 | 259 | 259 |
| Crystallization temperature Tc (° C.) | 462 | 479 | — | 489 | 479 | — | — | 512 |
| ΔT (K) [2] | 214 | 246 | — | 250 | 250 | — | — | 253 |
| Transmission limit wavelength (μm) [3] | 13.0 | 13.0 | 12.9 | 12.8 | 12.9 | 13.0 | 12.6 | 12.3 |

In Table 2, 1) to 3) are defined in the same manner as in Table 1. In Examples 13, 16, and 17, the crystallization temperature was not measured (crystallization was not observed).

Comparative Example 3 and Examples 19 to 21

Production of Infrared-Transmitting Glass, and Evaluation of the Halogen Content of the Obtained Glass Infrared-transmitting glasses of each of the following compositions were produced. The glass production method was the same as that of the Examples and Comparative Examples mentioned above.

Comparative Example 3 (same as above): $Ga_{12}Sb_{28}S_{60}$
Example 19: $Ga_{12}Sb_{25}Cs_4X_4S_{55}$ (X=Cl, Br, I)
Example 20: $Ga_{13}Sb_{21}Cs_8X_8S_{50}$ (X=Cl, Br, I)
Example 21: $Ga_{12}Sb_{17}Cs_{13}X_{13}S_{45}$ (X=Cl, Br, I)

Examples 19 to 21 correspond to compositions in which Sb and S in the composition of Comparative Example 3 were replaced by Cs and X. The raw material of halogen was cesium halide.

The type of X (halogen) was changed to Cl, Br, and I to thereby form three types of glasses in each Example, as shown below: Example 19-1(X=Cl), Example 19-2 (X=Br), Example 19-3 (X=I), Example 20-1 (X=Cl), Example 20-2 (X=Br), Example 20-3 (X=I), Example 21-1 (X=Cl), Example 21-2 (X=Br), and Example 21-3 (X=I). Example 20-2 corresponds to Example 14 mentioned above, and Example 21-1 corresponds to Example 12 mentioned above; however, they are referred to herein as Example 20-2 and Example 21-1.

Figure 4:
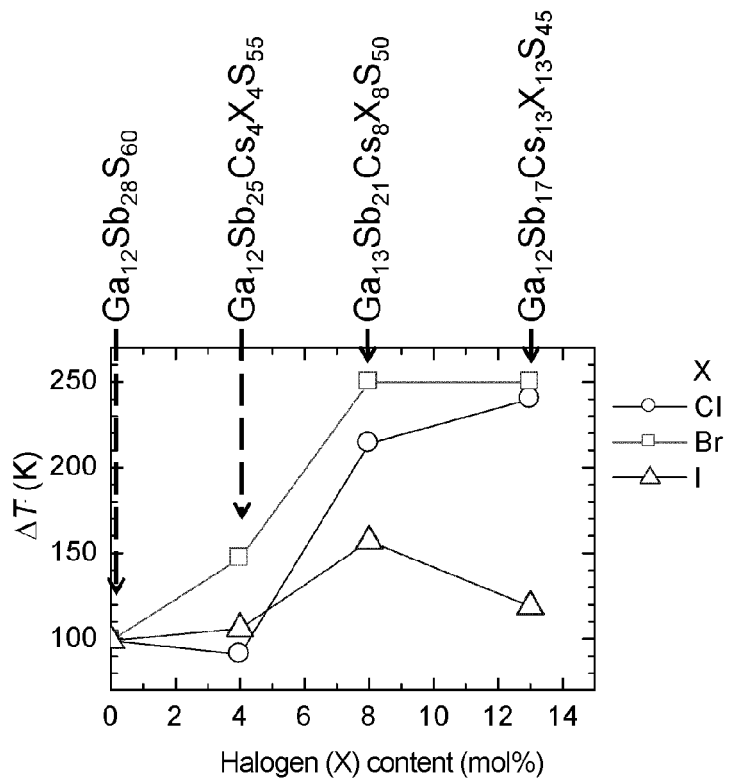
FIG. 4 shows changes in ΔT of glasses obtained in Comparative Example 3 and Examples 19 to 21.

FIG. 4 shows changes in ΔT of the glasses obtained in Comparative Example 3 and Examples 19 to 21.

As is clear from the results of FIG. 4, in the case of X=Cl, when the X content was 4%, ΔT was slightly reduced compared with Comparative Example 3; however, ΔT was increased along with the increase in the X content to 8% and 13%. In the case of X=Br, ΔT was increased along with the increase in the X content to 4% and 8%; however, ΔT was almost constant when the X content was 13%. In the case of X=I, ΔT was gradually increased along with the increase in the X content to 4% and 8%; however, ΔT was reduced when the X content was 13%.

As stated above, because halogen and cesium, which is a cation paired with the halogen, are added, the thermal stability of the glass is increased, and the mold formability is improved. However, these effects are low when the halogen content exceeds approximately 8 to 10%. If halogen is contained in an amount exceeding the above range, the water resistance of the glass may be reduced. Therefore, the halogen content is preferably 10% or less.

Figure 5:
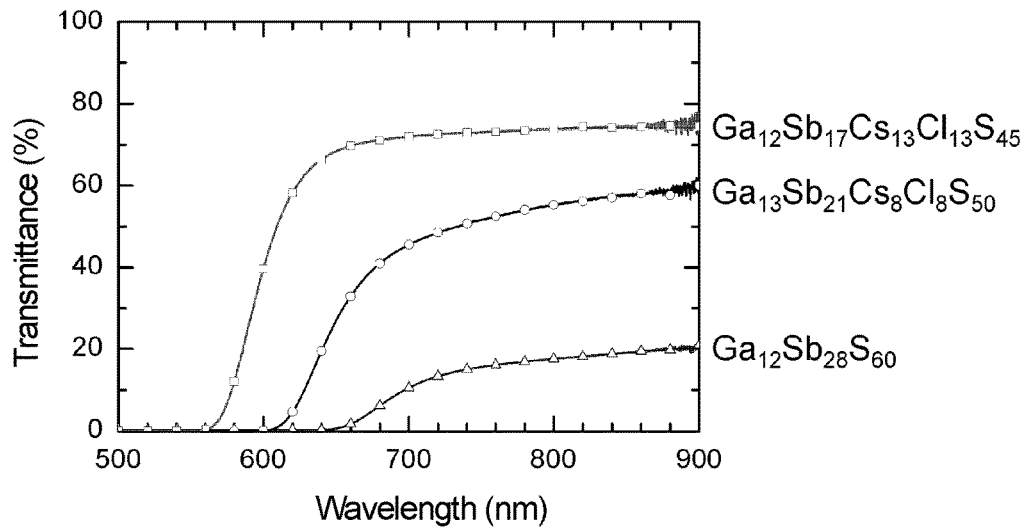
FIG. 5 shows the transmission spectra of glasses obtained in Comparative Example 3, Example 20-1, and Example 21-1 on the short wavelength side.

Next, FIG. 5 shows the transmission spectra of the glasses obtained in Comparative Example 3, Example 20-1, and Example 21-1 on the short wavelength side.

As is clear from the results of FIG. 5, the transmission limit wavelength (the transmission limit wavelength is defined in the same manner as in the note in Table 1) of the glass obtained in Comparative Example 3 was 700 nm, whereas the transmission limit wavelength of the glass obtained in Example 20-1 was 655 nm, and the transmission limit wavelength of the glass obtained in Example 21-1 was 598 nm. The transmission limit wavelength was shifted to the short wavelength side as the Cl content was increased. This tendency is obtained not only when X is Cl, but also when X is Br or I.

Glasses with a transmission limit wavelength of 655 nm or 598 nm allow light in part of the visible region to pass through. Accordingly, glasses containing halogen allow not only infrared rays, but also light in part of the visible region to pass through. In this respect, the transmissivity of visible light is increased along with the increase in the halogen content; however, the water resistance of glass may be reduced if the halogen content is increased. Therefore, in consideration of balance, the halogen content is preferably 10% or less.

Test Example 1

Figure 6:
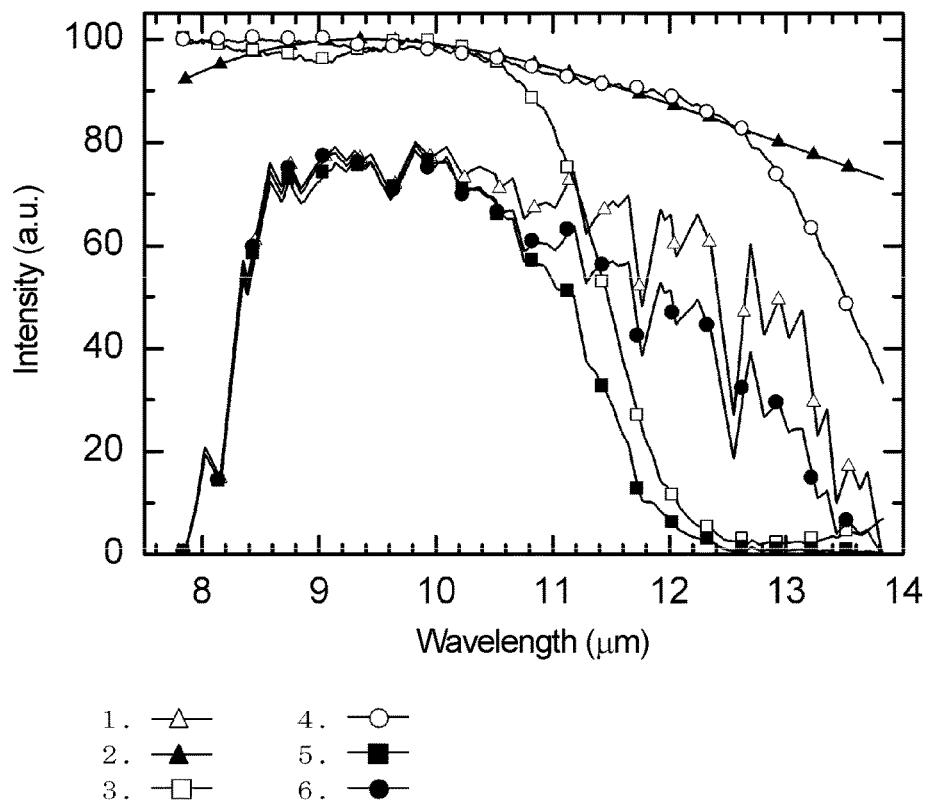
FIG. 6 shows the transmission spectrum (Δ) of an atmospheric window at a wavelength from 7.5 μm to 14 μm, the spectrum (▲) of black body radiation having the same temperature as human body temperature (36° C., 309 K), the transmission spectrum (□) of the glass obtained in Comparative Example 8, the transmission spectrum (○) of the glass obtained in Example 5, and relative transmission spectra obtained by multiplying each of the transmission spectrum of Comparative Example 8 and the transmission spectrum of Example 5 by the spectrum of the atmospheric window and the spectrum of the black body radiation (Comparative Example 8: ■, Example 5: ●).

Sensitivity of the Glasses Produced an Example 5 and Comparative Example 6 as Infrared Sensor Lenses FIG. 6 shows the transmission spectrum (Δ) of an atmospheric window at a wavelength from 7.5 μm to 14 μm, the spectrum (▲) of black body radiation having the same temperature as human body temperature (36° C., 309 K), the transmission spectrum (□) of the glass obtained in Comparative Example 8, and the transmission spectrum (○) of the glass obtained in Example 5. FIG. 6 also shows relative transmission spectra obtained by multiplying each of the transmission spectrum of Comparative Example 8 and the transmission spectrum of Example 5 by the spectrum of the atmospheric window and the spectrum of the black body radiation (Comparative Example 8: ■, Example 5: ●). Note that the transmission spectrum of each glass was calculated in such a manner that an antiflection film was deposited on the glass surface so that loss caused by reflection was negligible.

The relative spectra of infrared rays having a wavelength of 7.5 μm to 14 μm radiated from a human, passing through air, and transmitting an infrared sensor lens produce using each of the above glasses are represented by ■ and ●. As is clear from FIG. 6, a large difference was observed in relative intensity between 11 μm to 14 μm. This difference is considered to correspond to the final sensitivity as the infrared sensor lens. Strictly speaking, although it depends on the wavelength dependency of the sensitivity of the detector of the infrared sensor, the integral value of relative intensity of light transmitting each glass is calculated to be 226 in the glass of Comparative Example 8, and 296 in the glass of Example 5. It is revealed that the sensitivity of the glass of Example 5 is improved by 30% or more.

REFERENCE SIGNS LIST

1. Transmission spectrum of an atmospheric window at a wavelength from 7.5 µm to 14 µm
2. Spectrum of black body radiation having the same temperature as human body temperature (36° C., 309 K)
3. Transmission spectrum of the glass obtained in Comparative Example 8
4. Transmission spectrum of the glass obtained in Example 5
5. Relative transmission spectrum obtained by multiplying the transmission spectrum of Comparative Example 8 by the spectrum of the atmospheric window and the spectrum of the black body radiation
6. Relative transmission spectrum obtained by multiplying the transmission spectrum of Example 5 by the spectrum of the atmospheric window and the spectrum of the black body radiation

The invention claimed is:

1. An infrared-transmitting glass suitable for mold forming, comprising, in terms of molar concentration:
   0 to 2% of Ge,
   3 to 30% of Ga,
   10 to 40% of Sb,
   45 to 70% of S,
   3 to 30% of at least one member selected from the group consisting of Sn, Ag, Cu, Te, and Cs, and
   0 to 30% of at least one member selected from the group consisting of Cl, Br, and I.

2. The infrared-transmitting glass according to claim 1, wherein the glass comprises Cs and at least one halogen element selected from the group consisting of Cl, Br, and I, and the molar concentration of the halogen element is 3 to 20%.

3. The infrared-transmitting glass according to claim 1, wherein the total molar concentration of Cl and Br is equal to or less than the total molar concentration of Ag, Cu, and Cs.

4. The infrared-transmitting glass according to claim 1, wherein the glass is free from Se and As.

5. The infrared-transmitting glass according to claim 1, wherein the glass allows infrared rays having a wavelength of 3 to 13 µm to pass through.

6. The infrared-transmitting glass according to claim 2, wherein the glass further allows light in part of the visible region to pass through.

7. The infrared-transmitting glass according to claim 1, wherein the difference ($\Delta T$) between the crystallization temperature (Tc) and the glass transition temperature (Tg) is 230 K or more.

8. The infrared-transmitting glass according to claim 1, wherein no crystallization is observed when the glass is heated to 600° C.

9. The infrared-transmitting glass according to claim 1 for producing a spherical lens, an aspheric lens, a lens array, a microlens array, or a diffraction grating by mold forming.

* * * * *